United States Patent
Donderici et al.

(10) Patent No.: US 10,495,524 B2
(45) Date of Patent: Dec. 3, 2019

(54) APPARATUS AND METHOD FOR MONITORING PRODUCTION WELLS

(71) Applicant: Halliburton Energy Services, Inc., Houston, TX (US)

(72) Inventors: Burkay Donderici, Houston, TX (US); Aixa Maria Rivera-Rios, Houston, TX (US); Weijun Guo, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 15/775,381

(22) PCT Filed: Dec. 9, 2015

(86) PCT No.: PCT/US2015/064731
§ 371 (c)(1),
(2) Date: May 11, 2018

(87) PCT Pub. No.: WO2017/099751
PCT Pub. Date: Jun. 15, 2017

(65) Prior Publication Data
US 2018/0328793 A1 Nov. 15, 2018

(51) Int. Cl.
| | | |
|---|---|---|
| *G01K 11/32* | (2006.01) | |
| *G01V 3/30* | (2006.01) | |
| *G01V 3/20* | (2006.01) | |
| *G01V 3/26* | (2006.01) | |
| *G01V 5/04* | (2006.01) | |

(Continued)

(52) U.S. Cl.
CPC .......... *G01K 11/32* (2013.01); *G01H 9/004* (2013.01); *G01V 1/226* (2013.01); *G01V 3/20* (2013.01); *G01V 3/26* (2013.01); *G01V 3/30* (2013.01); *G01V 5/04* (2013.01); *G01V 11/002* (2013.01); *G01V 2210/6163* (2013.01); *G01V 2210/6167* (2013.01)

(58) Field of Classification Search
CPC ...... G01V 11/32; G01V 1/126; G01V 11/002; G01V 3/26; G01V 3/20; G01H 9/004
See application file for complete search history.

(56) References Cited

U.S. PATENT DOCUMENTS

| | | | |
|---|---|---|---|
| 8,789,587 B2 | 7/2014 | Tubel et al. | |
| 8,836,927 B2* | 9/2014 | Lopez | G01D 5/353 356/73.1 |

(Continued)

OTHER PUBLICATIONS

International Search Report and Written Opinion of the Searching Authority for corresponding International Application PCT/US2015/064731 dated Sep. 1, 2016.

*Primary Examiner* — Akm E Ullah
(74) *Attorney, Agent, or Firm* — Locke Lord LLP (57) ABSTRACT

A fiber optic distributed sensing system for installation within a wellbore is provided. The system includes a first set of downhole sensors having one or more nuclear sensors with nuclear field sensitivity. The system additionally includes, a second set of downhole sensors having one or more ElectroMagnetic (EM) sensors with electromagnetic field sensitivity. The fiber optic distributed sensing system also includes a processor system configured to receive data measurements from the first and second sets of sensors and configured to conjointly process the data measurements into representations of physical attributes of the wellbore.

14 Claims, 8 Drawing Sheets

(51) Int. Cl.
  *G01V 1/22*    (2006.01)
  *G01H 9/00*    (2006.01)
  *G01V 11/00*   (2006.01)

(56) References Cited

U.S. PATENT DOCUMENTS

| | | | |
|---|---|---|---|
| 9,279,317 B2 * | 3/2016 | Lee | G01H 13/00 |
| 9,766,119 B2 * | 9/2017 | Den Boer | G01V 1/40 |
| 2002/0117625 A1 * | 8/2002 | Pandelisev | G01T 1/20 |
| | | | 250/368 |
| 2005/0263281 A1 | 12/2005 | Lovell et al. | |
| 2008/0042869 A1 | 2/2008 | Zimmerman | |
| 2009/0188665 A1 * | 7/2009 | Tubel | E21B 23/03 |
| | | | 166/250.01 |
| 2011/0017512 A1 | 1/2011 | Codazzi | |
| 2014/0191120 A1 | 7/2014 | Donderici et al. | |
| 2016/0259079 A1 * | 9/2016 | Wilson | G01V 1/42 |
| 2017/0139071 A1 * | 5/2017 | Stokely | E21B 47/123 |
| 2017/0259513 A1 * | 9/2017 | Xia | G01H 9/004 |
| 2017/0260847 A1 * | 9/2017 | Xia | E21B 47/101 |

\* cited by examiner

FIG. 10

APPARATUS AND METHOD FOR MONITORING PRODUCTION WELLS

CROSS-REFERENCE TO RELATED APPLICATIONS

This application is the U.S. National stage of PCT International Application No. PCT/US2015/064731, filed Dec. 9, 2015, the contents of which are incorporated herein by reference in its entirety.

TECHNICAL FIELD OF THE INVENTION

The embodiments disclosed herein relate to sensing systems and, more particularly, to a system and method for permanently monitoring wells with nuclear and ElectroMagnetic (EM) fiber optic sensors.

BACKGROUND OF THE INVENTION

Oil field operators drill boreholes into subsurface reservoirs to recover oil and other hydrocarbons. After the primary production phase, at least some percentage of oil typically remains in the reservoir. In order to recover the residual oil in the reservoir, improved oil recovery techniques are applied. One particular improved oil recovery technique consists of injection of water, steam or chemical into the reservoir via secondary ("injection") wells to encourage the oil to move to the primary ("production") wells and thence to the surface. This injection could be monitored to minimize contamination of the oil in the production well. In conjunction with the permanent monitoring of production and injection wells, some decisions can be made to maximize the oil production and minimize the contamination. These decisions could include modifying injection parameters, such as reducing or stopping the injection, or modifying production parameters, such as flow rate at certain depth intervals, based on the monitoring measurements.

Furthermore, information about the geologic formations and about reservoir characteristics promotes efficient development and management of hydrocarbon resources. Reservoir characteristics include, among others, resistivity of the geologic formation containing hydrocarbons. The resistivity of geologic formations is generally related to porosity, permeability, and fluid content of the reservoir. Because hydrocarbons are generally electrically insulating and most formation water is electrically conductive, formation resistivity (or conductivity) measurements are a valuable tool in determining the hydrocarbon content of reservoirs. Moreover, formation resistivity measurements may be used to monitor changes in reservoir hydrocarbon content during production of hydrocarbons.

Generally, formation resistivity is sensitive to fluid saturation. The ability to remotely determine and monitor formation resistivity is of direct relevance to reservoir monitoring, particularly for enhanced recovery with waterflooding and/or carbon dioxide injection. Accordingly, there is continued interest in the development of permanent sensing systems.

SUMMARY OF THE INVENTION

The embodiments disclosed herein relate to a fiber optic distributed sensing system for installation within a wellbore. The system includes a first set of downhole sensors having one or more nuclear sensors with nuclear field sensitivity. The system additionally includes, a second set of downhole sensors having one or more ElectroMagnetic (EM) sensors with electromagnetic field sensitivity. The fiber optic distributed sensing system also includes a processor system configured to receive data measurements from the first and second sets of sensors and configured to conjointly process the data measurements into representations of physical attributes of the wellbore.

BRIEF DESCRIPTION OF THE SEVERAL VIEWS OF THE DRAWING

For a more complete understanding of the disclosed embodiments, and for further advantages thereof, reference is now made to the following description taken in conjunction with the accompanying drawings in which.

DETAILED DESCRIPTION OF THE DISCLOSED EMBODIMENTS

The following discussion is presented to enable a person skilled in the art to make and use the invention. Various modifications will be readily apparent to those skilled in the art, and the general principles described herein may be applied to embodiments and applications other than those detailed below without departing from the spirit and scope of the disclosed embodiments as defined herein. The disclosed embodiments are not intended to be limited to the particular embodiments shown, but are to be accorded the widest scope consistent with the principles and features disclosed herein.

The following disclosed embodiments present a fiber optic-based technology suitable for use in permanent downhole reservoir monitoring environment that utilize joint interpretation of the measurements obtained from permanently deployed EM and nuclear sensors. One illustrative fiber optic distributed sensing system for installation within a wellbore has an array of EM sensors and nuclear sensors positioned in an annular space around a well casing, the downhole sensors being coupled to a surface interface via a fiber optic sensing cable. Generally, EM sensors comprise resistivity sensors which measure mainly the resistivity of a formation, while nuclear sensors can be used for estimation of formation porosity. The change in formation porosity can be measured and monitored by either monitoring formation compaction with passive nuclear sensors or by performing direct in-situ measurements with a system that includes at least one radioactive source and an array of fiber optic-based detectors. Illustrative EM and nuclear sensors provide signals that are representative of performed measurements. The disclosed fiber optic distributed sensing system is capable of using the received EM and nuclear measurements to determine petro physical properties in a subsurface formation by producing a petro-physical model of the formation surrounding the well. In at least some embodiments, the disclosed systems and methods can be applied to permanently monitor fluid movement within reservoirs including, but not limited to, water-flooding, steam injection, and gas flooding. Gas-flooding, such as using carbon-dioxide or methane, is similar to water-flooding but entails injecting a gas instead of water to displace hydrocarbons to a primary well. In the case of water-flooding (injection of water), the petro-physical model could consist of water saturation $S_w$, porosity $\phi$, and permeability. It is desirable to be able to determine the porosity of the formation directly from the measured properties. Advantageously, at least some of the disclosed nuclear methods are able to provide such direct porosity measurements. However, the depth of investigation of the nuclear sensor devices usually extends to approximately 2-3 meters, which is frequently less than the depth of investigation of the EM sensors. On the other hand, the nuclear sensors typically provide improved resolution. Therefore, the EM and nuclear measurements complement each other to produce a more reliable model of the formations. Furthermore, as set forth below, the disclosed embodiments of permanent fiber optic distributed sensing system can provide a time-lapse (4D) measurement, from which flow models can be obtained, to make appropriate decisions during the production phase. Generally, time-lapse monitoring of producing oil fields is an accepted method for optimization of field development and product recovery, providing significant improvements in recovery rates and savings in drilling costs. Furthermore, time-lapse reservoir monitoring advantageously increases the ability to image fluid movement between wells.

Figure 1A:
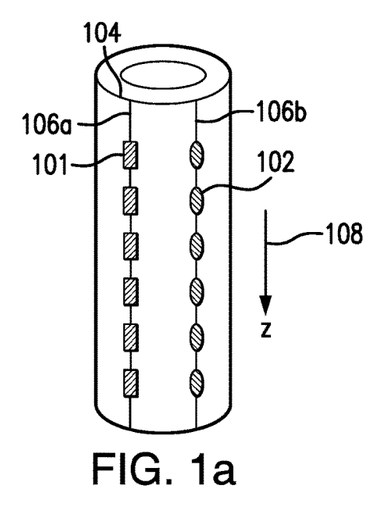
FIGS. 1A-1D show various illustrative sensing array configurations according to the disclosed embodiments.

Turning now to the drawings, FIGS. 1A-1D show various illustrative sensing array configurations according to the disclosed embodiments. A borehole typically contains a casing 104 with a fiber optic sensing cables 106 secured to it. Casing 104 is a tubular pipe, usually made of steel that preserves the integrity of the borehole wall and borehole. FIG. 1A illustrates an exemplary sensor array configuration according to an embodiment of the present invention. In this exemplary embodiment, a plurality of EM sensors 101 are integrated into a first fiber optic sensing cable 106a to obtain electromagnetic field measurements and communicate those measurements to a surface interface 306 (shown in FIG. 3) via the first fiber optic sensing cable 106a. Furthermore, in this embodiment a plurality of nuclear sensors 102 are integrated into a second fiber optic sensing cable 106b to obtain nuclear measurements and communicate those measurements to the surface interface 306 via the second fiber optic sensing cable 106b. In various embodiments, the surface interface 306 interrogates those measurements through at least one method of multiplexing. As shown in FIG. 1A, both the first fiber optic sensing cable 106a and second fiber optic sensing cable 106b are placed along the casing 104 and the sensors 101, 102 are distributed along the axial (z) direction 108.

In general, the structure of EM sensors 101 disclosed herein is expected to be based on materials having properties with electrostrictive, magnetostrictive, or piezoelectric effect. According to embodiments illustrated in FIGS. 1A-1D, a plurality of EM sensors 101 is mechanically coupled to at least one fiber optic sensing cable (e.g., fiber optic cable 106a). When a voltage is applied across the electrostrictive, magnetostrictive or piezoelectric material, the deformation (i.e., change in shape) induces a strain on the fiber optic sensing cable 106. According to an embodiment of the present invention, such strain on the fiber optic sensing cable 106 can be remotely interrogated as part of the surface interface 306 using any of the fiber-optic strain measurement methods including, but not limited to, interferometric, fiber Bragg grating (FBG), fiber laser strain (FLS), and extrinsic Fabry-Perot interferometric (EFPI) methods. As a general rule, electrostrictive materials exhibit strains proportional to the square of the applied field strength (and vice versa), whereas piezoelectric materials exhibit strains that are directly proportional to the applied field strength.

Figure 1B:
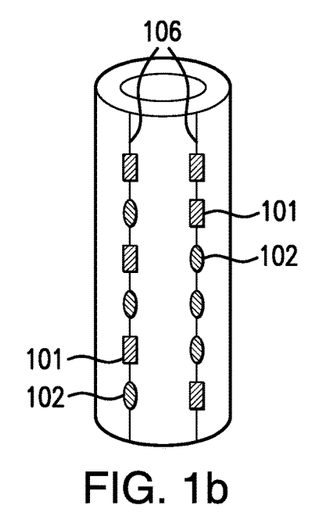

FIG. 1B illustrates another exemplary sensor array configuration according to another embodiment of the present invention. In this particular embodiment, both the EM sensors 101 and nuclear sensors 102 are integrated into each of the fiber optic sensing cables 106. As shown in FIG. 1B, the collocated EM 101 and nuclear 102 sensors again have the axial (z) direction 108 orientation. Notably, EM 101 and nuclear 102 sensors can be collocated in different parts of fiber optic cables 106 to achieve more sensitivity in specific areas of the well. For example, various nuclear sensors 101 can be distributed between EM sensors 102 to increase resolution measurements in those respective areas.

Figure 1C:
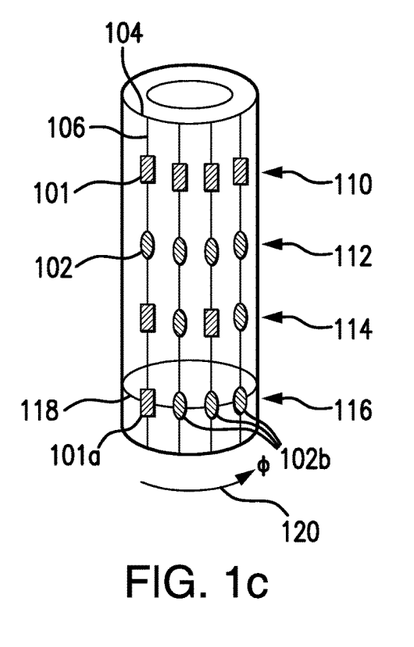

In yet another embodiment illustrated in FIG. 1C, the pluralities of EM sensors 101 and nuclear sensors 102 are distributed azimuthally. Following similar configurations as for the axial direction 108 in azimuthal direction 120, EM sensors 101 and nuclear sensors 102 can be placed in a single sensor array (e.g., arrays 110 and 112 in FIG. 1C) or can be collocated azimuthally (e.g., arrays 114 and 116 in FIG. 1C). The various distributions of EM 101 and nuclear 102 downhole sensors illustrated in FIG. 1C advantageously can be used to obtain more sensitivity in the azimuthal direction 120. For example, one EM sensor 101a can be placed and integrated with an electromagnetic sensing coil 118 surrounding the casing 104, while multiple nuclear sensors 102b can be placed around the EM sensor 101a. In this particular case the EM sensor 101a provides an azimuthal average of the corresponding electromagnetic signals, and the plurality of nuclear sensors 102b improve the resolution on the azimuthal direction 120.

Figure 1D:
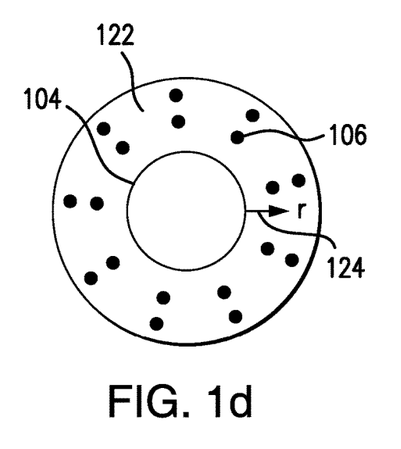

FIG. 1D illustrates a schematic surface view of another exemplary multi-type sensor array configuration, wherein the arrays of downhole sensors or fiber optic cables 106 can be distributed in the radial direction 124 to provide sensitivity in the direction of formation. As shown in FIG. 1D, the remaining annular space may be filled with cement 122 to secure the casing 104 in place and prevent fluid flows in the annular space. Fluid enters the uncemented portion of the well (or alternatively, fluid may enter through perforated portions of the well casing) and reaches the surface through the interior of the casing. The specific distribution of fiber optic cables 106 illustrated in FIG. 1D allows increased acquisition of rate of change of the fields along the radial direction 124, which can increase spatial diversity and provide multiple measurements with different depth of investigation. Advantageously, such measurements can improve radial estimation of resistivity or other petro physical parameters.

Figure 2A:
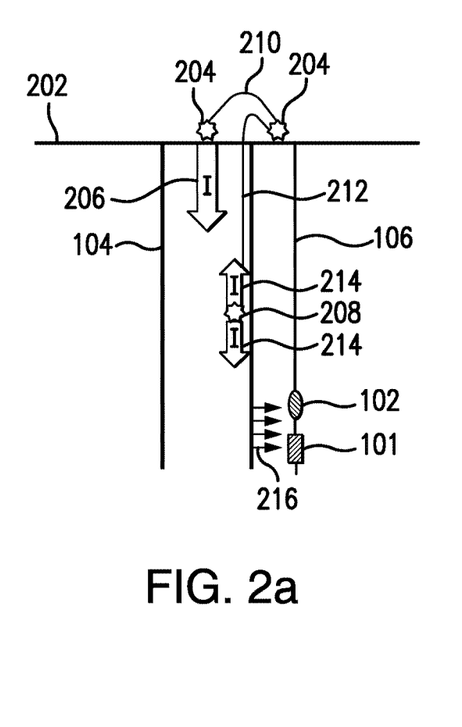
FIGS. 2A-2C show illustrative combined source-cable configurations according to the disclosed embodiments.
Figure 2B:
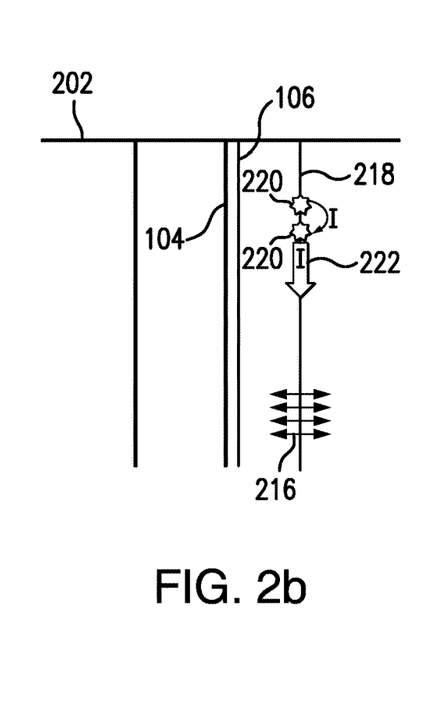
Figure 2C:
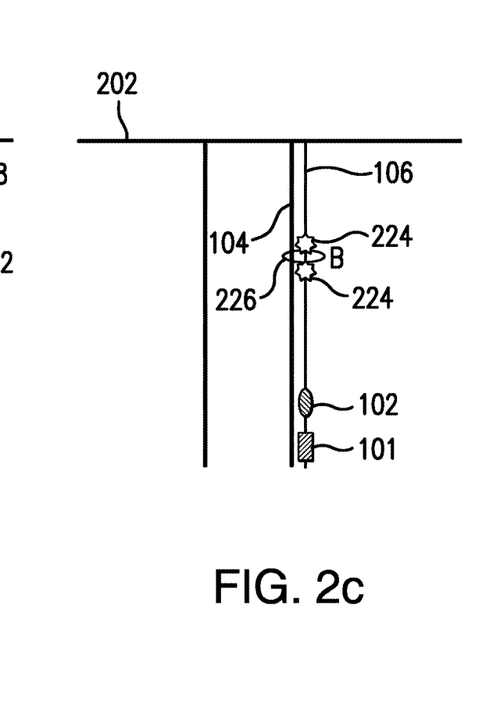

FIGS. 2A-2C show illustrative combined source-cable configurations according to the disclosed embodiments. For EM sensing, the sensor measurements in response to an injected current or another electromagnetic field source can be used to determine a resistivity distribution around the well, which in turn enables tracking of the flood front. In various embodiments, at least two configurations of permanent electromagnetic field sources can be used.

In one exemplary embodiment illustrated in FIG. 2A, at least one power source (e.g., EM source electrode) 204 is coupled to the casing 104. Because the casing 104 is an electrically conductive material (e.g., steel), it acts as a source electrode for current flow into the formations surrounding the borehole. The magnitude and distribution of the current flow will vary in accordance with the source voltage and the formation's resistivity profile. The EM measurements by EM sensors 101 will thus be representative of the resistivity profile. This resistivity profile in turn is indicative of the fluids in the formation pores, enabling the flood front to be located and tracked over time.

The casing 104 constitutes a path for the source current 206 to flow with relatively small attenuation. However, by Ohm's law, some current 206 leaks 216 to the formation perpendicular to the casing 104 as the current 206 flows down. In this case the source needs to be placed as close as possible to the formation of interest so that the current in the formation will be maximized in order to improve formation evaluation. Accordingly, in one embodiment illustrated in FIG. 2A, the power source comprises an electric dipole. In this embodiment, at least one electrode (i.e. return electrode 208) is placed downhole. As shown in FIG. 2A, a conductive cable 212 can be used to connect the poles (i.e., the injection electrode 204 and return electrode 208) of the dipole and generate a path for current flow 214 along the casing 104. Another conductive cable 210 may be used to connect two or more surface electrodes 204

In another embodiment, protective metal shield 218 of another fiber optic cable can be used as the conduit for the current 222, as shown in FIG. 2B. In this case, a plurality of dipoles 220 can be placed along the conductive metal shield 218, to focus the EM signal in specific areas of interest. In some embodiments the shield 218 can be a unitary metallic shield. In other embodiments, an insulated layer can be used to surround the shield 218 in some areas in order to focus the current leak 216 in specific areas of interest.

FIG. 2C illustrates yet another source-cable configuration according to the disclosed embodiments. This embodiment employs a single fiber cable 106 with a plurality of dipoles 224 and the plurality of EM 101 and nuclear 102 sensors attached thereto. In addition, this embodiment employs an excitation coil 226. In this case, the current for the excitation coil 226 is provided on the current lines that are extended from the surface 202.

With respect to nuclear measurements, a technique known as gamma ray logging may be utilized in one embodiment. The gamma ray logging is a passive technique that measures incoming gamma-rays from the formation after removing borehole background signal. If gamma ray logging is employed, each of the nuclear sensors 102 comprises a gamma ray detector that detects the gamma rays produced by the formation. In this case, no nuclear source is needed for the nuclear sensors 102. Through additional time-lapse seismic or other remote surveying data, the formation compaction can be observed by reduction of bed thickness. This data can be used to update the geologic model and to map the evolution of the depletion patterns as the recovery process matures. The depletion patterns within the reservoir will be influenced, for example, by well placement decisions, geological heterogeneity, well failures, and day to day operating decisions.

Other illustrative embodiments provide a nuclear source, such as Cs-137, for the nuclear sensors 102. It should be understood that this illustrative embodiment of the present disclosure may be used in connection with any non-rigid (e.g., wireline, slickline, e-line, etc.) conveyance systems for such nuclear sources In this case each of the nuclear sensors 102, which may or may not be a photon-counting detector, measures the back-scattered source particles. The number of back-scattered source particles is a function of formation porosity.

It should be further understood that as a matter of convenience, many embodiments of the invention are described herein in the context of a fiber optic distributed sensing system having an arrangement of EM and nuclear downhole sensors. However, it is to be understood that the present invention is not so limited and that many other fiber optic-based downhole sensors are envisioned and possible within the teachings of this disclosure. Examples of particular downhole sensors that may also be implemented in a disclosed permanent fiber optic distributed sensing system include Distributed Acoustic Sensors (DAS) and Distributed Temperature sensors (DTS), among others. DTS sensing systems utilize fiber optic cables or other devices capable of measuring temperature values at multiple locations along the length of a wellbore. DTS can be used to measure, for example, a continuous temperature profile along the wellbore by measuring temperature over many minutes of integration time. In at least some DAS systems an optical fiber can be configured as a continuous interferometer that is capable of measuring both acoustic signal and temperature. Moreover, if a DAS method is applied jointly with EM and nuclear measuring methods, the acoustic source of DAS can be also placed on the fiber optic cable 106. In additional or alternative aspects, a passive DAS method can be used. Another use of DAS systems is in seismic applications, in which seismic sources at known locations transmit acoustic signals into the formation, and/or passive seismic sources emit acoustic energy. The signals are received at seismic sensors after passing through and/or reflecting through the formation. The received signals can be processed to give information about the formation through which they passed. This methodology can be used to record a variety of seismic information. In these applications a borehole or surface seismic source can be used for DAS.

Figure 3:
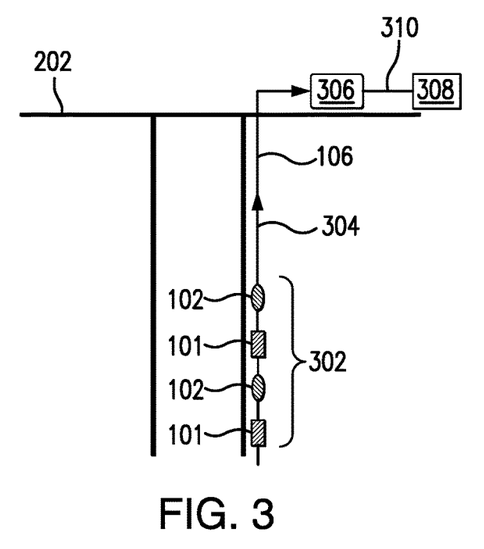
FIG. 3 is a schematic illustration of a permanent fiber optic distributed sensing system configured to perform data acquisition and analysis by utilizing a downhole sensor array arrangement in accordance with one embodiment of the present invention.

FIG. 3 is a schematic illustration of a permanent sensing system configured to perform data acquisition and analysis by utilizing a downhole sensor array arrangement in accordance with one embodiment of the present invention. As noted above, in such fiber optic distributed sensing system an optical signal (i.e., a light) is propagated from an optical source through the fiber optic cable 106 that conveys optical signals to and from the array 302 of electromagnetic 101 and nuclear 102 downhole sensors attached to the fiber optic cable 106. This signal is modified by the interaction of the sensor array 302 or by means of an interface that changes some physical parameters of the optical signal. The modifications may affect travel time t, amplitude A, phase φ, frequency f for wavelength λ content of the light pulses, enabling the downhole sensors to responsively produce an electrical output signal indicative of the sensor measurements using one or more known multiplexing techniques. Some systems may employ multiple fiber cables 106, in which case an additional light source and detector can be employed for each fiber cable 106, or the existing source and detector may be switched periodically between the fiber cables 106. Some system embodiments may alternatively employ continuous wave (CW) light rather than light pulses.

According to an embodiment of the present invention, the modified optical signal 304 corresponding to measured (EM or nuclear) data, returns to the surface 202, where it is detected by a surface interface (i.e., an interrogator device) 306 that is configured to convert the optical signal 304 to the corresponding physical signal (i.e., voltage V or density ρ, for EM and nuclear measurements, respectively). For example, the time of arrival information provides the information related to location of the measuring sensor and the phase φ of the optical signal provides information about the voltage.

Additionally, as shown in FIG. 3, the surface interface 116 may be coupled, for example via cable 310, to a computing device 308 that acts as a data acquisition and data processing system that analyzes the EM and nuclear measurements to derive subsurface parameters related to the formation. In some contemplated system embodiments, the computing device 308 may further control production parameters to reduce risk of breakthrough or to otherwise optimize production based on the information derived from the measurements. Production parameters may include the flow rate/pressure permitted from selected production zones, flow rate/pressure in selected injection zones, and the composition of the injection fluid, each of which can be controlled via computer controlled valves and pumps.

Generally, any such computing device 308 would be equipped with a user interface that enables a user to interact with the software via input devices such as keyboards, pointer devices, and touchscreens, and via output devices such as printers, monitors, and touchscreens. The software can reside in computer memory and on non-transient information storage media. The computing device 308 may be implemented in different forms including, e.g., an embedded computer permanently installed as part of the surface interface 116, a portable computer that is plugged into the surface interface 116 as desired to collect data, a remote desktop computer coupled to the surface interface 116 via a wireless link and/or a wired computer network, a mobile phone/PDA, or indeed any electronic device having a programmable processor and an interface for I/O.

Figure 4:
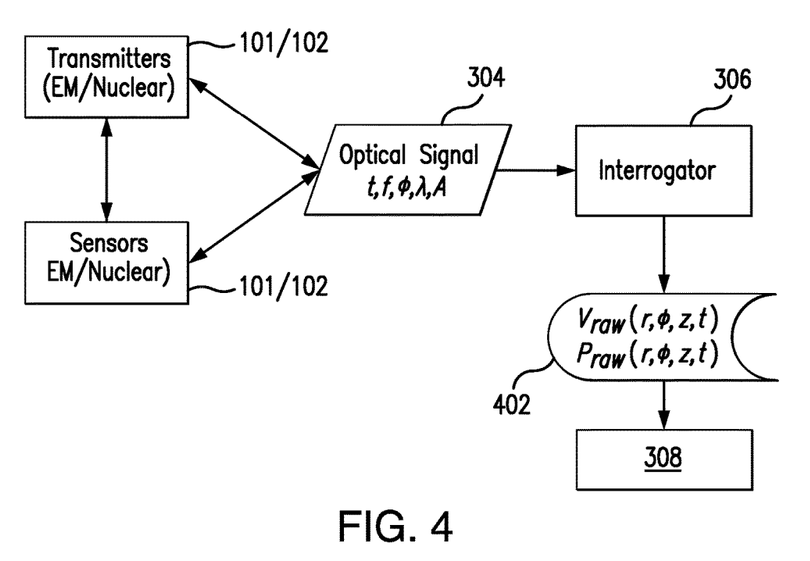
FIG. 4 shows schematically and exemplarily a data acquisition scheme employed by a permanent fiber optic distributed sensing system according to the disclosed embodiments.

FIG. 4 shows schematically and exemplarily a data acquisition scheme employed by a permanent fiber optic distributed sensing system according to the disclosed embodiments. The basic functional parts of the system comprise two or more surface modules, such as, but not limited to, surface interface (e.g., interrogator device) 306 which is communicatively coupled to the surface computing device 308. The essential functional parts of the system further comprise at least one fiber-optic cable 106 (shown in FIG. 3) and a plurality of downhole sensors/transmitters described above, such as, but limited to, EM sensors 101 and nuclear sensors 102. As noted above, if an array of downhole sensors 302 is attached to the same fiber optic cable 106, a multiplexing technique can be applied to separate the signals from each sensor 101, 102. The surface interface 306 typically includes an optical port for coupling the sensing optical fiber(s) in cable 106 to a light source and a detector.

Figure 5:
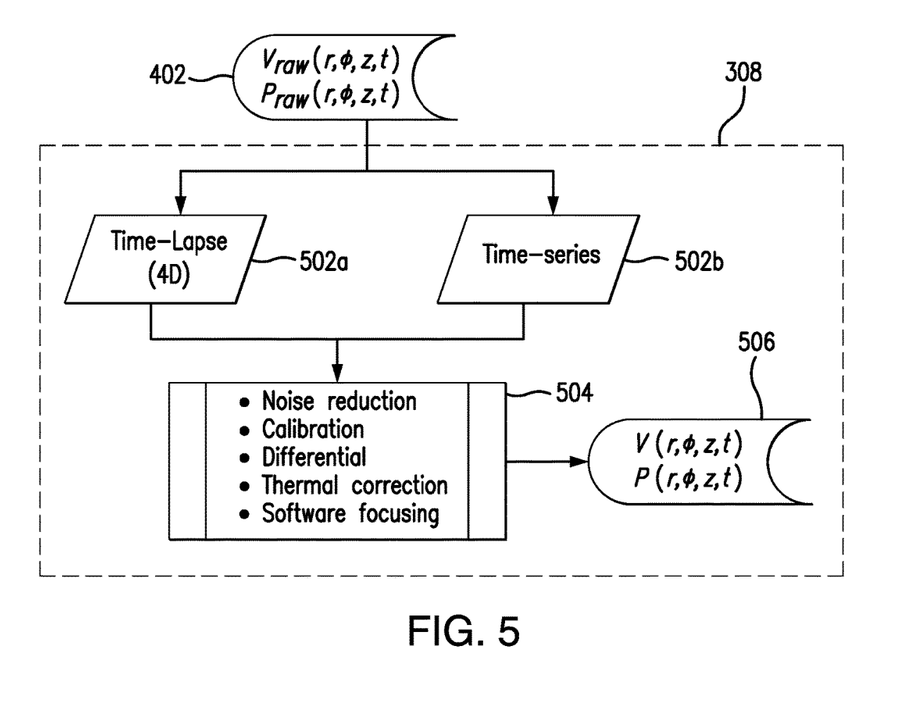
FIG. 5 shows schematically and exemplarily a data processing scheme employed by a permanent fiber optic distributed sensing system according to the disclosed embodiments.

FIG. 5 shows schematically and exemplarily a data processing scheme employed by a permanent fiber optic distributed sensing system according to the disclosed embodiments. In the disclosed system, monitoring of the flood front is accomplished by detecting changes in the formation over time. This is preferably accomplished by measuring resistivity and porosity of the formation. As mentioned above, the resistivity of the formation is obtained through the measurement of EM fields in the formation using the EM sensors 101, while the porosity of the formation is obtained through the measurement of compaction in the formation using the nuclear sensors 102. Both the EM 101 and nuclear 102 downhole sensors are preferably permanently installed in the wellbore, so that continuous monitoring of raw physical signals 402 over time is available.

According to an embodiment of the present invention, this continuous monitoring provides to the computing device 308 either time-lapse measurements 502a or time-series data 502b. In some examples, a time-lapse measurement 502a may be performed, in which electric or magnetic fields at each EM sensor 101 location and porosity at each nuclear sensor 102 location, respectively, are measured as a function of time. In a time-lapse measurement system, first a sensor signal is recorded at a time when there is no flood. During reservoir monitoring for waterfront, a differential signal (between the no flood case and with flood case) at each sensor is recorded—which is the field due to flood. As the flood approaches closer to downhole sensors 101 and 102 (e.g., in a well), the differential signal gets larger. The intensity of the signal typically indicates a distance to the flood front. The time-series data 502b typically contains time series values for the formation properties of interest over a period of time.

As shown in FIG. 5, the computing device 308 performs one or more data processing steps 504 on either time-lapse measurements 502a or time-series data 502b to obtain more reliable measurements of the formations of interest. In other words, the processed data 506 more accurately indicates formation features or properties of interest (i.e., V and ρ). The one or more processing steps 504 that may be employed by the computing device 308 in various embodiments of the present invention include, but are not limited to, noise reduction, calibration, differential of data, thermal correction, software focusing, and the like. The computing device 308 may utilize any approach known in the art, such as, but not limited to filters, to implement processing of the received signals that reduces the quantization noise in the spectrum of the converted measurements. Furthermore, the received time-lapse 502a and/or time-series 502b data can be calibrated, preferably by well log data, to determine some of the physical parameters (e.g., conductivity σ or density ρ). The calibrated data may then be used by the computing device 308 to generate various models described below in conjunction with FIGS. 6 and 7. According to embodiments of the present invention, the differential of time-lapse measurements 502a or time-series data 502b from different downhole sensors 101, 102 can be applied to remove or emphasize some effects. Other corrective signals may also be generated by the computing device 308. For example, the computing device 308 can also use various known temperature tables and/or temperature values provided by digital temperature sensors (DTS) for thermal correction. In a still further embodiment of the present invention, software focusing can be applied to increase the depth of detection or vertical resolution, by stacking and processing time-based data 502 measured by the pluralities of EM 101 and nuclear 102 downhole sensors.

Figure 6:
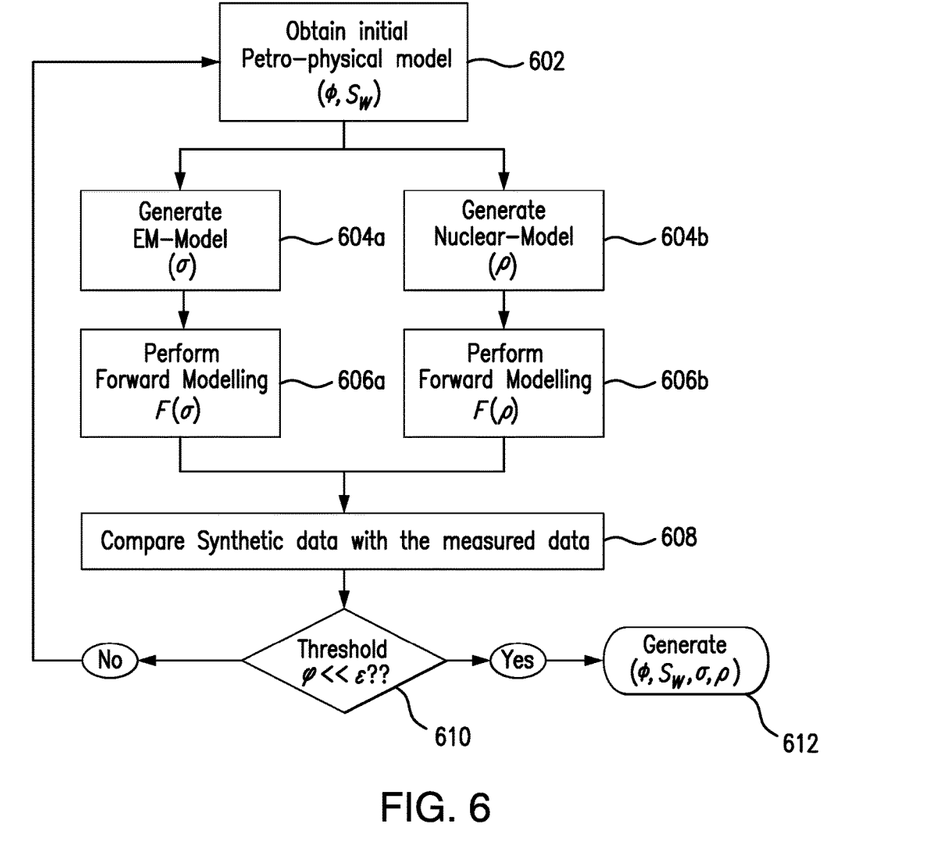
FIG. 6 is a flowchart depicting a process of performing a joint inversion in accordance with one embodiment of the present invention.
Figure 7:
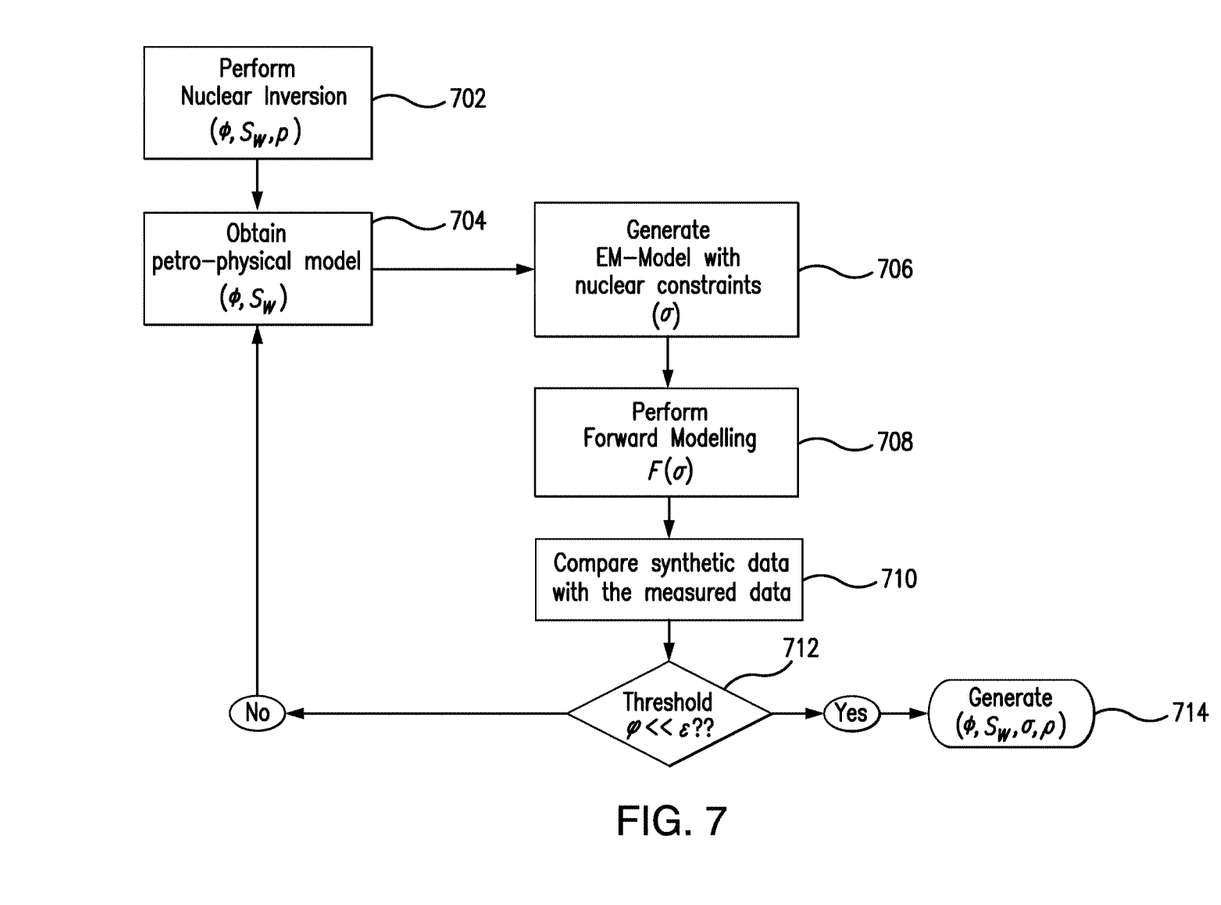
FIG. 7 is a flowchart depicting an alternative process of performing a joint inversion in which nuclear data is used as constraint for EM inversion in accordance with an alternative embodiment of the present invention.

FIGS. 6 and 7 are flowcharts depicting techniques of performing a joint inversion in accordance with embodiments of the present invention. Before turning to description of FIGS. 6 and 7, it is noted that the flow diagrams in FIGS. 6 and 7 show examples in which operational steps are carried out in a particular order, as indicated by the lines connecting the blocks, but the various steps shown in this diagram can be performed in any order, or in any combination or sub-combination. It should be appreciated that in some embodiments some of the steps described below may be combined into a single step. In some embodiments, one or more additional steps may be included.

In the present context, the computing device 308 may be capable of executing encoded instructions stored, for example, on tangible computer-readable media (e.g., read-only memory, random access memory, a hard drive, optical disk, flash memory, etc.). It should be appreciated that each step depicted in FIGS. 6 and 7 may correspond to a particular set of instructions and/or routines for performing the specified step using acquired EM and nuclear data.

In general, the geophysical inversion attempts to find a mathematical model of subsurface petro-physical properties that optimally explains observed data and satisfies various geological and geophysical constraints. There are a large number of well-known methods of geophysical inversion. For example, 3D inversion has been used in data interpretation. It generally involves iterative forward modeling (numerically solving Maxwell's equations) and comparing to measured EM or nuclear data, then updating the resistivity and/or conductivity models for the next iteration. Current approaches for building the resistivity and conductivity models generally depend on the availability of the data for specific subsurface parameters. For example, in the case of water flood, the received physical properties of interest with respect to the geological formation of interest are those related to water content in the formation, such as saturation $S_w$, porosity $\phi$, and permeability.

Referring now to FIG. 6, FIG. 6 is a flowchart depicting a process of performing a joint EM and nuclear inversion in accordance with one embodiment of the present invention. To start the iteration process, an initial petro-physical model of the subsurface is needed. Accordingly, at step 602, the computing device 308 obtains an initial petro-physical model based on relations of reservoir rock petro-physical properties (i.e., porosity distribution and permeability) with respective nuclear and/or EM parameters. For example, Archie's law may be used to relate the electrical conductivity ($\sigma$) or resistivity ($R=1/\sigma$) with petro-physical parameters ($S_w$ and $\phi$,). Archie's equation for total conductivity provides:

$$\sigma_t = \frac{1}{a}\sigma_w \phi^m S_w^n \tag{1}$$

wherein $\sigma_t$ is the total conductivity of the formation, $\phi_w$ is the conductivity of the fluid (e.g., water), $\phi$ is the porosity, $S_w$ is water saturation, and (a, m, n) are factors related to the lithology of formation. From these relations the EM and nuclear models of the subsurface can be obtained (steps 604a and 604b, respectively). Moreover, at least in some embodiments, the nuclear sensors 102 may be able to directly measure the porosity of the formation.

According to an embodiment of the present invention, the computing device 308 utilizes the EM and nuclear models generated in steps 604a and 604b to generate synthetic geophysical data for each model (steps 606a and 606b, respectively) by means of a forward modeling technique (stochastic approach), for example.

Next, at step 608, the computing device 308 compares the generated synthetic geophysical data for each model, F ($\sigma$) and F ($\rho$), with the corresponding measured data $d_{EM}$ and $d_{Nuclear}$, obtained by the plurality of EM sensors 101 and nuclear sensors 102, respectively. Advantageously, the computing device 308 calculates the difference between the measured and synthetic geophysical data for both EM and nuclear models. In one embodiment, such difference may be calculated at step 608 using the following equation:

$$\varphi = \|d_{EM} - F(\sigma)\|_p + \|d_{Nuclear} - F(\rho)\|_p \tag{2}$$

As shown in FIG. 6, once the difference is calculated, at step 610, the computing device 308 determines whether the measured and synthetic data are substantially similar. In one embodiment, the computing device 308 makes this determination by comparing the value calculated at step 608 with a pre-specified similarity threshold $\varepsilon$ at step 610. In one embodiment, the similarity threshold may be stored in a memory of the computing device 308.

If the measure of similarity ($\varphi$) does not meet the pre-specified threshold $\varepsilon$ (decision block 610, No branch), the computing device 308 modifies the variables of the initial petro-physical model using, for example, a global optimization method known in the art and repeats the steps 602-610 described above until convergence of the predicted petro physical properties and the measured petro physical properties is reached. In response to determining that convergence of the synthetic petro physical data and the measured petro physical data is reached (decision block 610, Yes branch), at step 612, the computing device 308 generates an optimized petro-physical model. Advantageously, the optimized petro-physical model generated by the computing device 308 at step 612 takes into consideration both EM and nuclear sets of data and provides more accurate representation of the subsurface rock structure of interest as compared to conventional inversion process utilizing a single set of measured data (i.e., measured EM data or measured nuclear data).

Referring now to FIG. 7, FIG. 7 is a flowchart depicting an alternative process of performing an inversion in accordance with an alternative embodiment of the present invention. In this embodiment, to start the iteration process, an initial nuclear petro-physical model of the subsurface is needed. Thus, at step 702, the computing device 308 performs nuclear data inversion in order to generate an initial nuclear petro-physical model (at step 704) based on the data acquired by a plurality of nuclear sensors 102. Generally, the inversion process performed in this embodiment is similar to the inversion process described above in conjunction with FIG. 6. However, in this case, the computing device 308 uses the initial nuclear data-based petro-physical model (generated at step 704) as a constraint for the petro-physical model generated in the EM inversion data domain (step 706).

Next, according to this embodiment of the present invention, the computing device 308 utilizes the constrained EM model generated in steps 706 to generate synthetic petro-physical data by means of a forward modeling technique (step 708). At step 710, the computing device 308 compares the generated predicted petro-physical data, F ($\sigma$), with the corresponding measured data $d_{EM}$, obtained by the plurality of EM sensors 101. In this case, the computing device 308 compares the two data sets and calculates the measure of similarity using the following equation:

$$\varphi = \|d_{EM} - F(\sigma)\|_p \tag{3}$$

According to the embodiment illustrated in FIG. 7, the computing device 308 then compares the measure of similarity calculated at step 710 with a pre-specified similarity threshold ε at step 712. If the measure of similarity(φ) does not meet the pre-specified threshold ε (decision block 712, No branch), the computing device 308 modifies the variables of the initial nuclear data-based petro-physical model and repeats the steps 706-712 described above until convergence of the predicted petro physical properties and the measured petro physical properties is reached. In response to determining that convergence of the synthetic petro physical data and the measured petro physical data is reached (decision block 712, Yes branch), at step 714, the computing device 308 generates an optimized petro-physical model. Advantageously, the optimized EM data-based petro-physical model generated by the computing device 308 at step 714 utilizes the nuclear inversion data as a constraint and provides more accurate representation of the subsurface rock structure of interest as compared to conventional inversion process utilizing a single set of measured data (i.e., measured EM data). For example, the detected nuclear measurements have good vertical resolution, and less depth of detection than EM measurements. Therefore, the nuclear data-based petro-physical model generated at step 704, advantageously, may provide some control with respect to thin bedding and/or improve measurements resolution where the EM data set produces smooth measurement values, as non-limiting examples of correlation between the employed inversion schemes.

It should be understood that the above-described illustrative embodiments of the present disclosure may be used in connection with any inversion scheme utilizing any suitable type of geophysical data (e.g., DAS). For example, in one embodiment, both DAS and nuclear data-based models can be used as constraint for the EM inversion performed in step 706 described above. In addition, DAS, nuclear and EM measurements can be inverted separately, as described above with reference to FIG. 6, and then jointly compared in the interpretation of the models. As an example, water saturation can be derived from the nuclear data, which can be converted to resistivity through Archie's equation (1) or a similar equation. The derived resistivity value can be applied by the computing device 308 to the resistivity inversion as a constraint on the shallow resistivity of the formation. In one embodiment, the shallow resistivity of the formation can be fixed to be equal to the derived resistivity value. In the alternative embodiment, the shallow resistivity of the formation can be constrained to be within a certain range (e.g., from approximately 10% to approximately 20%) of the derived resistivity value.

Figure 8:
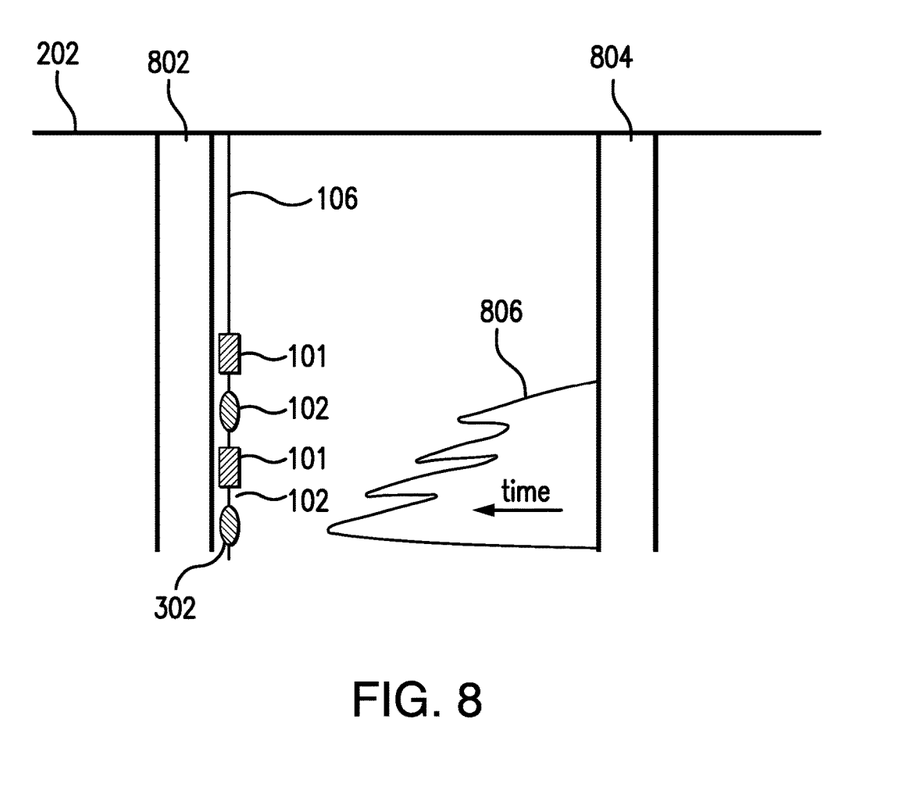
FIG. 8 is a schematic illustration of water flood monitoring by a permanent fiber optic distributed sensing system according to the disclosed embodiments.
Figure 9:
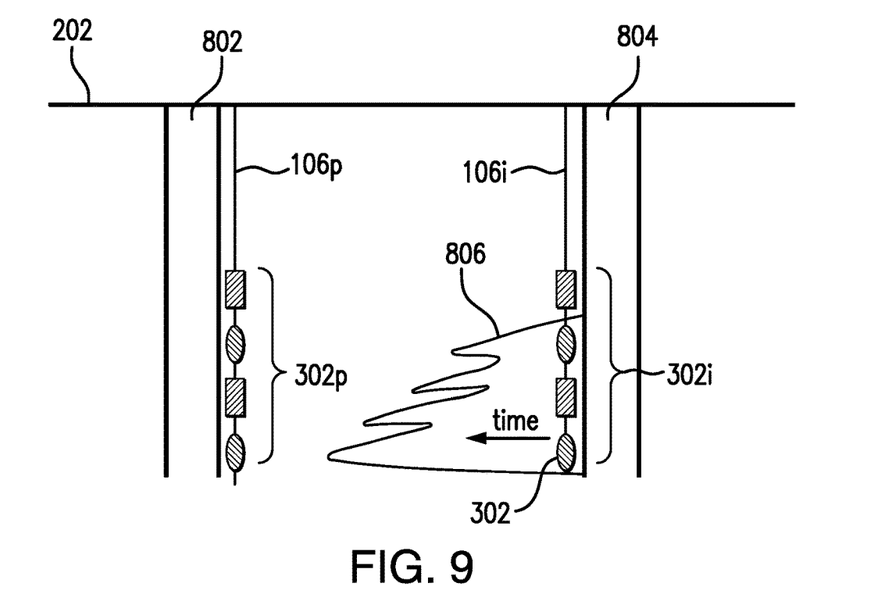
FIG. 9 is a schematic illustration of multiwell monitoring by a permanent fiber optic distributed sensing system according to the disclosed embodiments.
Figure 10:
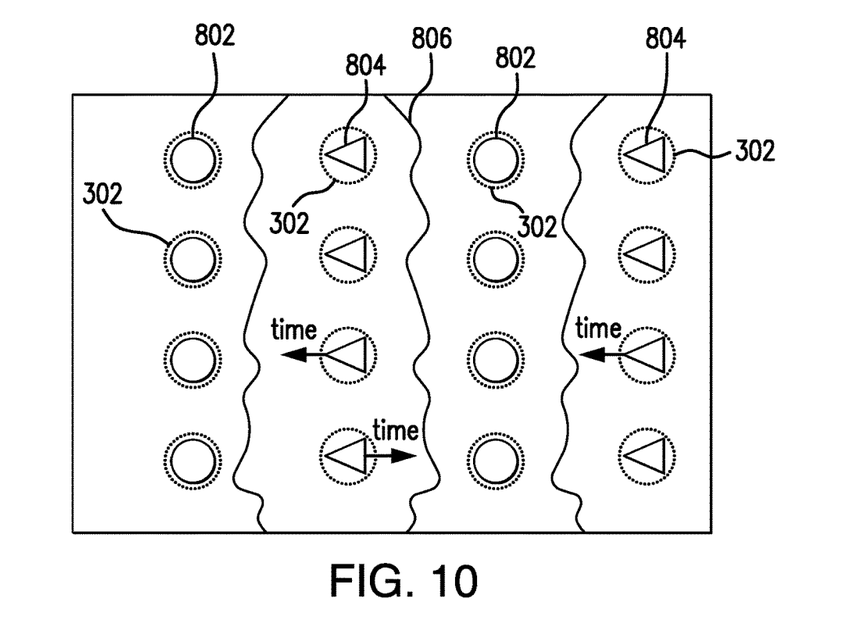
FIG. 10 is a surface view depicting multiwell monitoring by a permanent fiber optic distributed sensing system according to the disclosed embodiments.

FIGS. 8-10 illustrate different approaches to interpret and analyze the measured EM and nuclear data obtained by a plurality of EM 101 and nuclear sensors 102 in accordance with various embodiments of the present inversion. For example, if the EM and nuclear data are inverted separately, their respective petro-physical models can be compared for quality control. Because the data is measured over time, various petro-physical models can be obtained for different time periods. These petro-physical models over time can be applied to improve a water-flow simulation and obtain better prediction on the path of the water-flood. Moreover, the time-lapse data can be used in an inversion of EM and nuclear data over time, using techniques well-known in the art. From the resolution obtained by nuclear measurements, these techniques can provide information about the porosity change of the formation of interest. Therefore, when used jointly with EM sensors, a better description of the porosity change and bedding compaction over time can be obtained.

FIG. 8 is a schematic illustration of water flood monitoring by a permanent fiber optic distributed sensing system according to the disclosed embodiments. In this embodiment, a single fiber optic cable 106 having a plurality of EM 101 and nuclear 102 downhole sensors attached thereto is deployed on the well 802 and is utilized for monitoring water-flood 806 over various time periods. Based on the data obtained by the EM 101 and nuclear 102 downhole sensors, the fiber optic distributed sensing system can perform a water flow simulation. The results of such simulation can be applied to predict the path of water and can help with making decisions with respect to whether to stop and/or reduce the injection of water 806. Moreover, such water flow simulation can also be used by the fiber optic distributed sensing system to constraint the number of possible solutions of EM/nuclear/petro physical/acoustics inversions described above. In addition, in some embodiments the permanent fiber optic distributed sensing system may include instrumented smart wells. In such embodiments, the sensing system disclosed herein may be configured to turn on or off production from different zones of the well based on the inversion results. For example, in case of imminent water flood breakthrough, production in the breakthrough zones can be turned off to minimize the amount of water 806.

FIG. 9 is a schematic illustration of multiwell monitoring by a permanent fiber optic distributed sensing system according to the disclosed embodiments. In this embodiment, one fiber optic cable 106p having a first array 302p of electromagnetic and nuclear sensors attached thereto is deployed on the primary well 802 and another fiber optic cable 106i having a second array 302i of electromagnetic and nuclear sensors attached thereto is deployed on the secondary well 804. In this case both sensor arrays 302i and 302p are utilized for monitoring water-flood 806 over various time periods. For example, the water flow can be simulated from the secondary well's 804 petro-physical model using the petro-physical model corresponding to the primary well 802 as another constraint for the simulation. The multiwell monitoring environment depicted in FIG. 9 advantageously provides more accurate simulation model of water flow. Furthermore, the more accurate simulation model enables the permanent fiber optic distributed sensing system disclosed herein to produce better predictions, which leads to an improved decision making model with respect to both primary 802 and secondary 804 wells.

FIG. 10 is a surface view depicting multiwell monitoring by a permanent fiber optic distributed sensing system according to the disclosed embodiments. Note that this multiwell configuration is merely illustrative and not limiting on the scope of the disclosure. In this embodiment many primary wells 802 are provided with multiple production zones that can be individually controlled. Similarly, many secondary wells 804 are provided with multiple injection zones that can be individually controlled. As shown in FIG. 10, each of the plurality of secondary 804 and primary 802 wells is monitored by an individual array 302 having a plurality of EM and nuclear downhole sensors. Advantageously, the permanent fiber optic distributed sensing system having a configuration depicted in FIG. 10 is capable of generating a time-lapse model of the water-flood 806.

FIGS. 9 and 10 illustrate various embodiments where EM and nuclear sensor arrays 302 are deployed in both primary 802 and secondary wells 804. In these embodiments a multi-well analysis performed by the permanent sensing system can include monitoring of water production 806 from the secondary well 802. Various measurements provided by such monitoring can be fed into the reservoir model described above to obtain better estimates of the flood front and production. In addition, various geophysical data measurements gathered on the field can be also used by the disclosed fiber optic distributed sensing system as parameters for the water-flow simulation in order to obtain more accurate results.

Accordingly, as set forth above, the embodiments disclosed herein may be implemented in a number of ways. In general, in one aspect, the disclosed embodiments are directed to a fiber optic distributed sensing system for installation within a wellbore. The fiber optic distributed sensing system includes, among other things, a first set of downhole sensors having one or more nuclear sensors with nuclear field sensitivity. The sensing system additionally includes a second set of downhole sensors having one or more ElectroMagnetic (EM) sensors with electromagnetic field sensitivity. The fiber optic distributed sensing system also includes a processor system configured to receive data measurements from the first and second sets of sensors and conjointly process the data measurements into representations of physical attributes of the wellbore.

In one or more embodiments, the fiber optic distributed sensing system may further include any of the following features individually or any two or more of these features in combination: a) at least one of the first and second pluralities of downhole sensors may include at least one of: Distributed Acoustic Sensors (DAS) and Distributed Temperature Sensors (DTS) (b) at least one fiber optic sensing cable having at least one nuclear and at least one EM sensor attached thereto; (c) the at least one fiber optic sensing cable extends substantially vertically along a well casing and one or more of the first set of downhole sensors and the second set of downhole sensors are uniformly distributed along i) an axial length of the at least one fiber optic sensing cable, ii) along an azimuthal direction of the well casing; (d) each of the at least one fiber optic sensing cables is placed inside a well casing annulus and the first set of downhole sensors and the second set of downhole sensors are distributed at a plurality of different radial positions extending outwardly from an inner wall of the well casing; (e) a first current source placed at a surface of the earth and a second current source placed around a rock formation of interest along a well casing so that the current flows in a conduction portion of the well casing between the first and second current sources so as to generate an electromagnetic field in the rock formation of interest; (f) a plurality of current sources connected to conductive shield layers of the at least one fiber optic sensing cable, so as to generate an electromagnetic field in the rock formation of interest; and (g) a nuclear radiation source placed into the well and configured to provide nuclear radiation particles so as to generate a radiation field in a direct vicinity of a rock formation of interest.

In general, in yet another aspect, the disclosed embodiments are related to a method for monitoring physical attributes of a wellbore using a fiber optic distributed sensing system. The method includes, among other steps, the step of performing data measurements by a first set of downhole sensors and a second set of downhole sensors placed in the wellbore. The first set of downhole sensors includes one or more nuclear sensors with nuclear field sensitivity and the second set of downhole sensors includes one or more ElectroMagnetic (EM) sensors with electromagnetic field sensitivity. The method also includes the step of analyzing, by a processor system, the data measurements received from the first and second sets of sensors by generating two or more petro-physical reservoir models representing a plurality of petro-physical properties of a subsurface structure.

In one or more embodiments, the method for monitoring and controlling a reservoir system may further include any one of the following features individually or any two or more of these features in combination: (a) at least one of the first and second sets of downhole sensors includes at least one of DAS and DTS; (b) the generation of the first petro-physical model and the second petro-physical model is based on joint inversion combinations of the data measurements provided by the first set of downhole sensors and the data measurements provided by the second set of downhole sensors; (c) the analyzing further includes: i) forward modeling, by the processor, the plurality of petro-physical properties to generate predicted petro-physical properties for each of the two or more generated petro-physical reservoir models and ii) comparing, by the processor, the predicted petro-physical properties and the data measurements provided by the first and second sets of downhole sensors; and (d) adjusting one or more production parameters based on the performed analysis.

While particular aspects, implementations, and applications of the present disclosure have been illustrated and described, it is to be understood that the present disclosure is not limited to the precise construction and compositions disclosed herein and that various modifications, changes, and variations may be apparent from the foregoing descriptions without departing from the spirit and scope of the disclosed embodiments as defined in the appended claims.

What is claimed is:

1. A fiber optic distributed sensing system for installation within a wellbore, the system comprising:
   a first set of downhole sensors having one or more nuclear sensors with nuclear field sensitivity and a second set of downhole sensors having one or more ElectroMagnetic (EM) sensors with electromagnetic field sensitivity; and
   a processor system communicatively configured to receive data measurements from the first and second sets of sensors and conjointly process the data measurements into representations of physical attributes of the wellbore, wherein the processor system is configured to:
   generate an EM petro-physical reservoir model based on data measurements provided by the EM sensors;
   generate a nuclear petro-physical reservoir model based on data measurements provided by the nuclear sensors;
   generate synthetic geophysical data using the EM petro-physical reservoir model;
   generate synthetic geophysical data using the nuclear petro-physical reservoir model; and
   calculate the difference between the data measurements and the synthetic geophysical data for both the EM and nuclear models;
   wherein at least one fiber optic sensing cable extends substantially vertically along a well casing and wherein one or more of the first set of sensors and the second set of sensors are uniformly distributed along an axial length of the at least one fiber optic sensing cable or along an azimuthal direction of the well casing.

2. The system of claim 1, wherein at least one of the first and second sets of sensors comprises at least one of: Distributed Acoustic Sensors (DAS) and Distributed Temperature Sensors (DTS).

3. The system of claim 2, wherein at least one nuclear sensor and at least one EM sensor is communicatively coupled to the at least one fiber optic sensing cable.

4. The system of claim 3, wherein each of the at least one fiber optic sensing cables is placed inside a well casing annulus and wherein the first set of sensors and the second set of sensors are distributed at a plurality of different radial positions extending outwardly from an inner wall of the well casing.

5. The system of claim 1, further comprising a first current source placed at a surface of the earth and a second current source placed around a rock formation of interest along a well casing so that the current flows in a conduction portion of the well casing between the first and second current sources so as to generate an electromagnetic field in the rock formation of interest.

6. The system of claim 3, further comprising a plurality of current sources positioned along the length of the at least one fiber optic sensing cable, the current sources being connected to conductive shield layers of the at least one fiber optic sensing cable, so as to generate an electromagnetic field in the rock formation of interest.

7. The system of claim 1, further comprising a nuclear radiation source placed into the wellbore, the nuclear radiation source being configured to provide nuclear radiation particles so as to generate a radiation field in a direct vicinity of a rock formation of interest.

8. A method for monitoring physical attributes of a wellbore using a fiber optic distributed sensing system, the method comprising:
performing data measurements by a first set of downhole sensors having one or more nuclear sensors with nuclear field sensitivity and by a second set of downhole sensors having one or more ElectroMagnetic (EM) sensors with electromagnetic field sensitivity; and
analyzing, by a processor system, the data measurements received from the nuclear sensors and EM sensors by generating an EM petro-physical reservoir model based on data measurements provided by the EM sensors;
generating a nuclear petro-physical reservoir model based on data measurements provided by the nuclear sensors;
generating synthetic geophysical data using the EM petro-physical reservoir model;
generating synthetic geophysical data using the nuclear petro-physical reservoir model; and
calculating the difference between the data measurements and the synthetic geophysical data for both the EM and nuclear models;
wherein at least one fiber optic sensing cable extends substantially vertically along a well casing and wherein one or more of the first set of sensors and the second set of sensors are uniformly distributed along an axial length of the at least one fiber optic sensing cable or along an azimuthal direction of the well casing.

9. The method of claim 8, wherein at least one of the first and second sets of sensors comprises at least one of: Distributed Acoustic Sensors (DAS) and Distributed Temperature Sensors (DTS).

10. The method of claim 8, wherein the generation of the nuclear petro-physical reservoir model and the EM petro-physical reservoir model are based on joint inversion combinations of the data measurements provided by the first set of sensors and the data measurements provided by the second set of sensors.

11. The method of claim 8, wherein the nuclear petro-physical reservoir model comprises a constraint for the EM petro-physical reservoir model.

12. A method for monitoring and controlling a multiwell system comprising a plurality of primary and secondary wells, the method comprising:
performing data measurements by a first set of downhole sensors having one or more nuclear sensors with nuclear field sensitivity and by a second set of downhole sensors having one or more ElectroMagnetic (EM) sensors with electromagnetic field sensitivity, wherein the first and second sets of sensors are placed into at least one of the plurality of primary wells and/or into at least one of the plurality of secondary wells;
analyzing, by a processor system, the data measurements received from the nuclear sensors and EM sensors by generating a nuclear petro-physical reservoir model and an EM petro-physical model for each of the plurality of primary wells and each of the plurality of secondary wells, wherein each of the generated models represents a plurality of petro-physical properties of a subsurface structure substantially surrounding a corresponding primary well or secondary well; and for each of the plurality of primary wells and each of the plurality of secondary wells:
generating a nuclear petro-physical reservoir model based on data measurements provided by the nuclear sensors;
generating an EM petro-physical reservoir model based on data measurements provided by the EM sensors
generating synthetic geophysical data using the EM petro-physical reservoir model;
generating synthetic geophysical data using the nuclear petro-physical reservoir model; and
calculating the difference between the data measurements and the synthetic geophysical data for both the EM and nuclear models;
wherein at least one fiber optic sensing cable extends substantially vertically along a well casing and wherein one or more of the first set of sensors and the second set of sensors are uniformly distributed along an axial length of the at least one fiber optic sensing cable or along an azimuthal direction of the well casing.

13. The method of claim 12, wherein the analyzing comprises generating a four dimensional (4D) model of a water flooded portion of the subsurface structure.

14. The method of claim 12, further comprising adjusting one or more production parameters and adjusting one or more fluid injection parameters based on the performed analysis.

* * * * *